(12) United States Patent
Motegi

(10) Patent No.: US 6,509,975 B1
(45) Date of Patent: Jan. 21, 2003

(54) PRINTER SYSTEM

(75) Inventor: Akihiko Motegi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/345,481

(22) Filed: Jul. 1, 1999

(30) Foreign Application Priority Data

Jul. 1, 1998 (JP) .......................................... 10-201122

(51) Int. Cl.[7] .......................... G06K 15/02; G06F 3/12; G06F 13/00
(52) U.S. Cl. ...................................... 358/1.14; 358/1.15
(58) Field of Search .............................. 358/1.14, 1.15; 709/224; 710/19, 46–47

(56) References Cited

U.S. PATENT DOCUMENTS 5,821,924 A * 10/1998 Kikinis et al. ............... 345/212
5,867,720 A * 2/1999 Hirano .................. 395/750.06

FOREIGN PATENT DOCUMENTS

JP 08025757 A 1/1996 ............ B41J/29/38

* cited by examiner

*Primary Examiner*—Joseph Mancuso
*Assistant Examiner*—Douglas Tran
(74) *Attorney, Agent, or Firm*—Oblon, Spivak, McClelland, Maier & Neustadt, P.C.

(57) ABSTRACT

A printer system includes a plurality of client computers and a single network printer selectively connectable to the client computers via a server computer. A power supply control section is included in the printer for selectively turning on or turning off the power supply of the printer in response to remote control effected from any one of client computers via the server computer. A confirming section is also included in the printer for confirming, in response to a power OFF command received from any one of the client computers, the connection of client computers other than one sent the power OFF command. The power supply control section turns off the power supply if allowed on the basis of information output from the confirming section and representative of the connection of the other client computers.

2 Claims, 4 Drawing Sheets

PRINTER SYSTEM

BACKGROUND OF THE INVENTION

1. Field of the Invention

The present invention relates to a printer system and more particularly to a printer system for controlling the power supply of a network printer.

2. Discussion of the Background

A printer system for controlling the power supply of a network printer has been proposed in various forms in the past. Japanese Patent Laid-Open Publication No. 5-345460, for example, discloses a printer system in which a printer turns on or turns off its large capacity power supply section in response to data received from, e.g., a host computer. This printer system is directed toward power saving. Japanese Patent Laid-Open Publication No. 8-238822 teaches a printer system in which a printer turns on its power supply only during printing data so as to reduce power consumption. Further, Japanese Patent Laid-Open Publication No. 9-258857 proposes a printer system in which a printer turns on or turns off power supply to its printing parts in response to a command received from a host.

Generally, in a printer system, a number of users share a single network printer. Therefore, a problem with the above conventional printer system is that although the printing speed available with the printer may be high, one user cannot easily occupy the printer or perform another work when another user is producing a great amount of printings with the printer. Should the power supply of the printer be constantly turned on to allow all the users belonging to the system to use the printer anytime, the printer would wastefully consume power.

In light of the above, the power supply of the network printer may be turned on only when printing data and turned off thereafter by remote control, as in any one of the conventional printer systems. This successfully minimizes the power consumption of the network printer, but gives rise to the following problems. Assume that one user turns off the power supply of the printer by remote control, determining that the other user terminals are not operating, despite that any one of the other users is operating the user terminal or intending to access the printer. Then, the other users cannot access the printer at all. Further, when any one of the users issues a print job while the power supply of the printer is turned off, the user cannot use the printer indefinitely.

SUMMARY OF THE INVENTION

It is therefore an object of the present invention to provide a printer system allowing a network printer to turn on or turn off its power supply on the basis of remote control and thereby promoting easy and efficient use of the printer.

A printer system of the present invention includes a plurality of client computers and a single network printer selectively connectable to the client computers via a server computer. A power supply control section is included in the printer for selectively turning on or turning off the power supply of the printer in response to remote control effected from any one of client computers via the server computer. A confirming section is also included in the printer for confirming, in response to a power OFF command received from any one of the client computers, the connection of client computers other than one sent the power OFF command. The power supply control section turns off the power supply if allowed on the basis of information output from the confirming section and representative of the connection of the other client computers.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
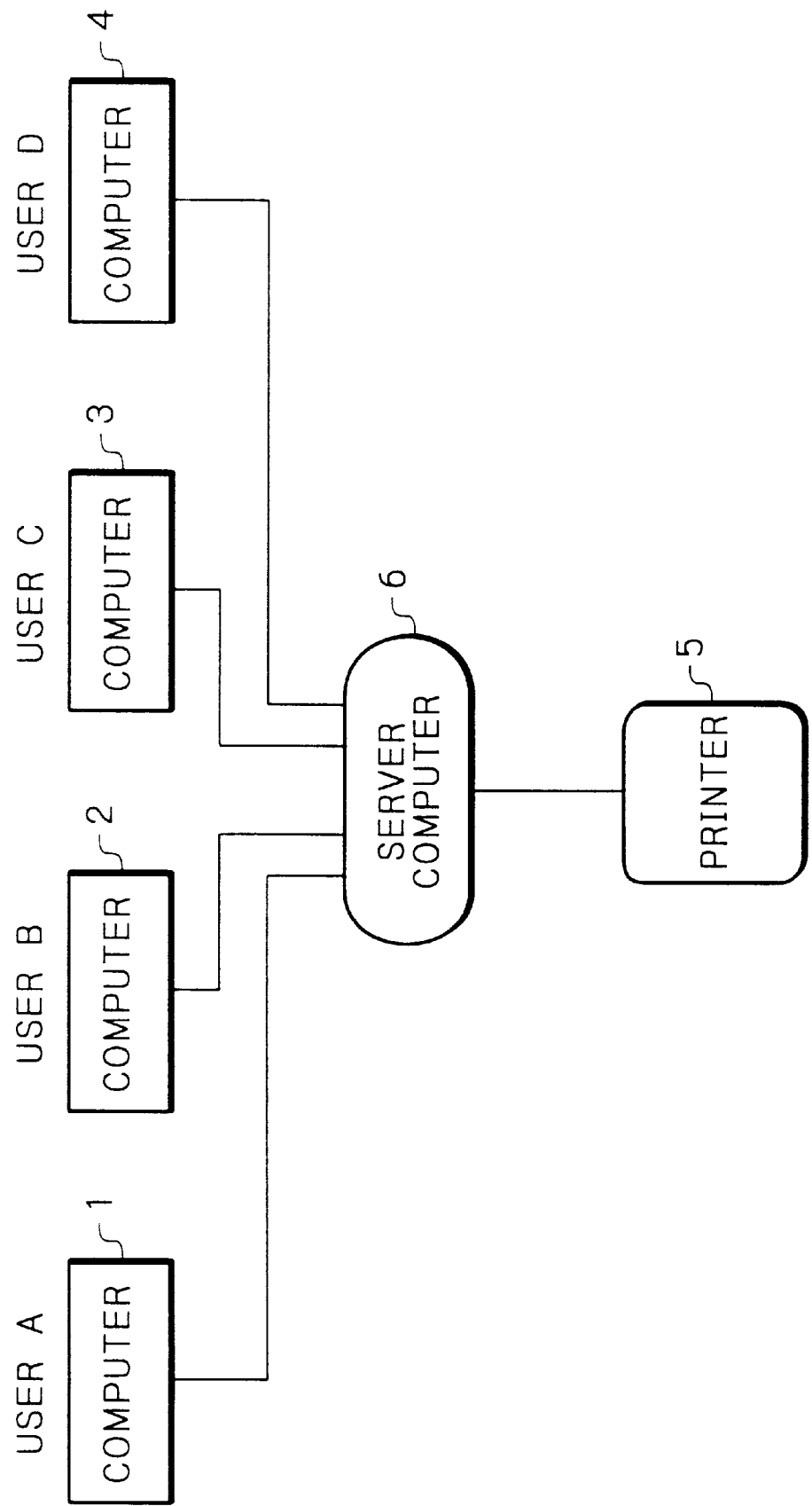
FIG. 1 is a block diagram schematically showing a printer system embodying the present invention.

Referring to FIGS. 1–4, a printer system embodying the present invention will be described. As shown in FIG. 1, the printer system includes computers or data input units 1, 2, 3 and 4 assigned to users A, B, C and D, respectively. The computers 1–4 are electrically connected to a printer or network printer 5 via a server computer 6 interfacing the computers 1–4 and printer 5. The users A–D each are capable of accessing the printer 5 via the server computer 6. The computers 1–4 and printer 5 are interconnected via the printer 5 by conventional I/F (interface) cables although not shown or described specifically.

Figure 2:
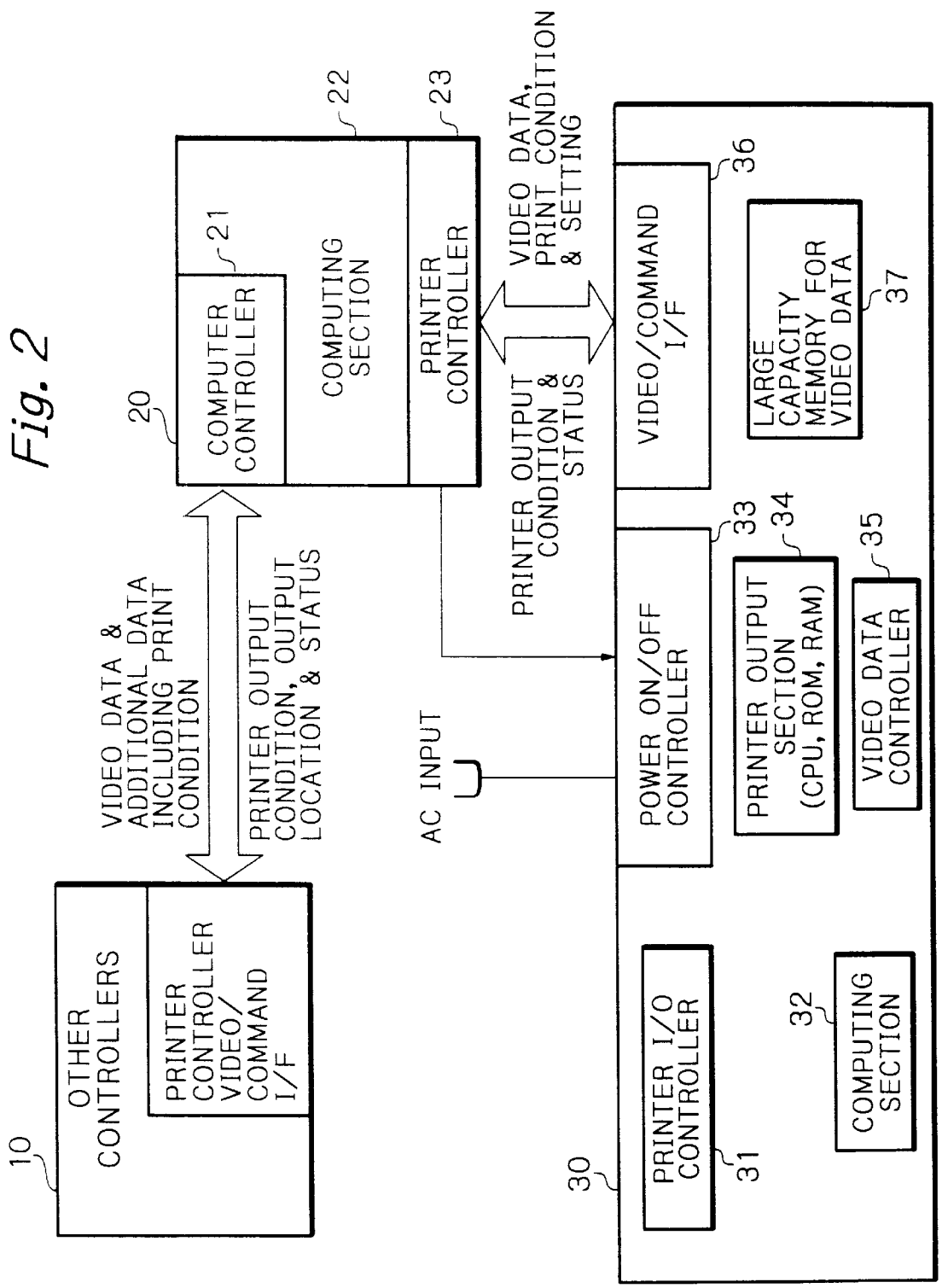
FIG. 2 is a block diagram schematically showing the illustrative embodiment more specifically.

FIG. 2 shows specific configurations of the various units constituting the printer system of FIG. 1. As shown, a client computer (any one of the computers 1–4, FIG. 1) includes a printer controller connected to the server computer 20 and having a video/command I/F. A server computer 20 (server computer 6, FIG. 1) includes a computer controller 21 also including an I/F (not shown) connected to the computer 10, a computing section 22, and a printer controller 23. The client computer 10 sends video data and additional data including data representative of print conditions to the server computer 20. The server computer 20 transfers such data to a printer 30 (printer 5, FIG. 1) via an I/F included in the printer controller 23.

The printer or network printer 30 includes a video/command I/F 36 connected to the server computer 20, a video data controller 35, a computing section 32, and a printer I/O (Input/Output) controller 31. The printer 30 further includes a printer output controller 34 including a CPU (Central Processing Unit), a ROM (Read Only Memory) storing a control program, and a RAM (Random Access Memory) for storing control data. The printer 30 additionally includes a large capacity memory 37 for controlling a large capacity video memory, a power supply section (not shown) connected to a commercial AC power supply, and a power ON/OFF controller 33 for turning on or turning off the power supply section in accordance with a command received from the server computer 20. The power ON/OFF controller 33 is the characteristic feature of the illustrative embodiment.

For the ON/OFF control of the power supply section, a conventional relay or similar electronic switch may be used. The printer 30 sends its various statuses including an output status to the server computer 20 both during printing and stand-by state. The server computer 20 sends information received from the printer 30 to the client computer 10 while adding, e.g., an output location to the information.

Figure 3:
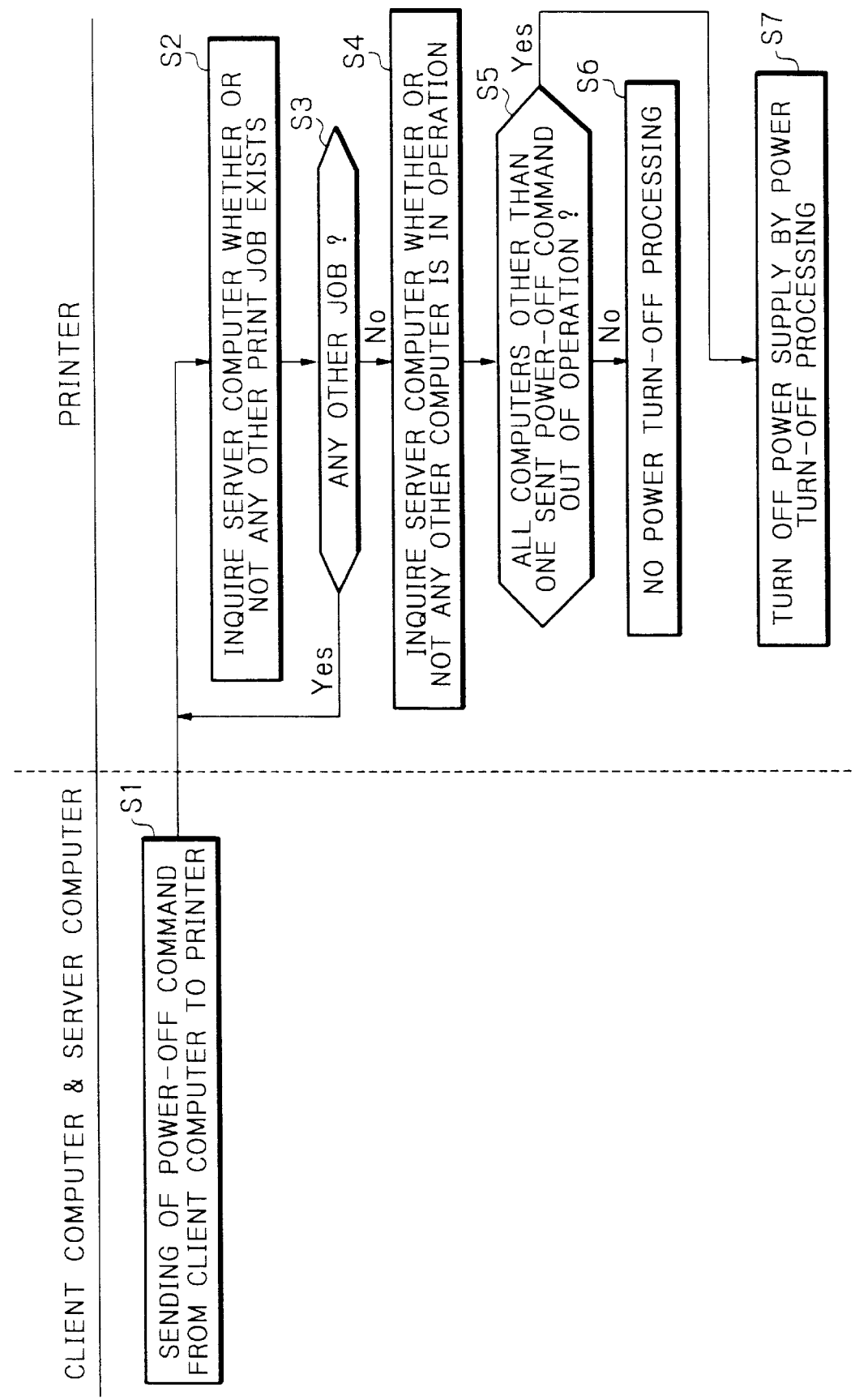
FIG. 3 is a flowchart demonstrating a specific operation for turning off the power supply of a network printer included in the illustrative embodiment.

Reference will be made to FIG. 3 for describing specific operations of the client computer, server computer and printer relating to the power ON/OFF control of the printer. The server computer constantly communicates with client computers and printer in order to recognize the number of computers connected thereto and the operating conditions of the printer including the number of jobs.

First, the operator of the client computer sends a power OFF command meant for the printer to the server computer (step S1). The server computer transfers the power OFF command to the printer. In response, the printer inquires the server computer whether or not any job under way or to be executed exists (step S2). If any job under way or to be executed exists (Yes, step S3), the printer does not execute power OFF processing until all the jobs complete. When all the jobs complete (No, step S3), the printer inquires the server computer whether or not any client computer physically connected to the server computer is still operating (step S4). If all the client computers included in the system except for one sent the power OFF command to the printer are out of operation (Yes, step S5), the printer executes the power OFF processing for turning off its power supply section (step S7). If the answer of the step S5 is No, the printer does not execute the above processing and invalidates the power OFF command received via the server computer (step S6).

Figure 4:
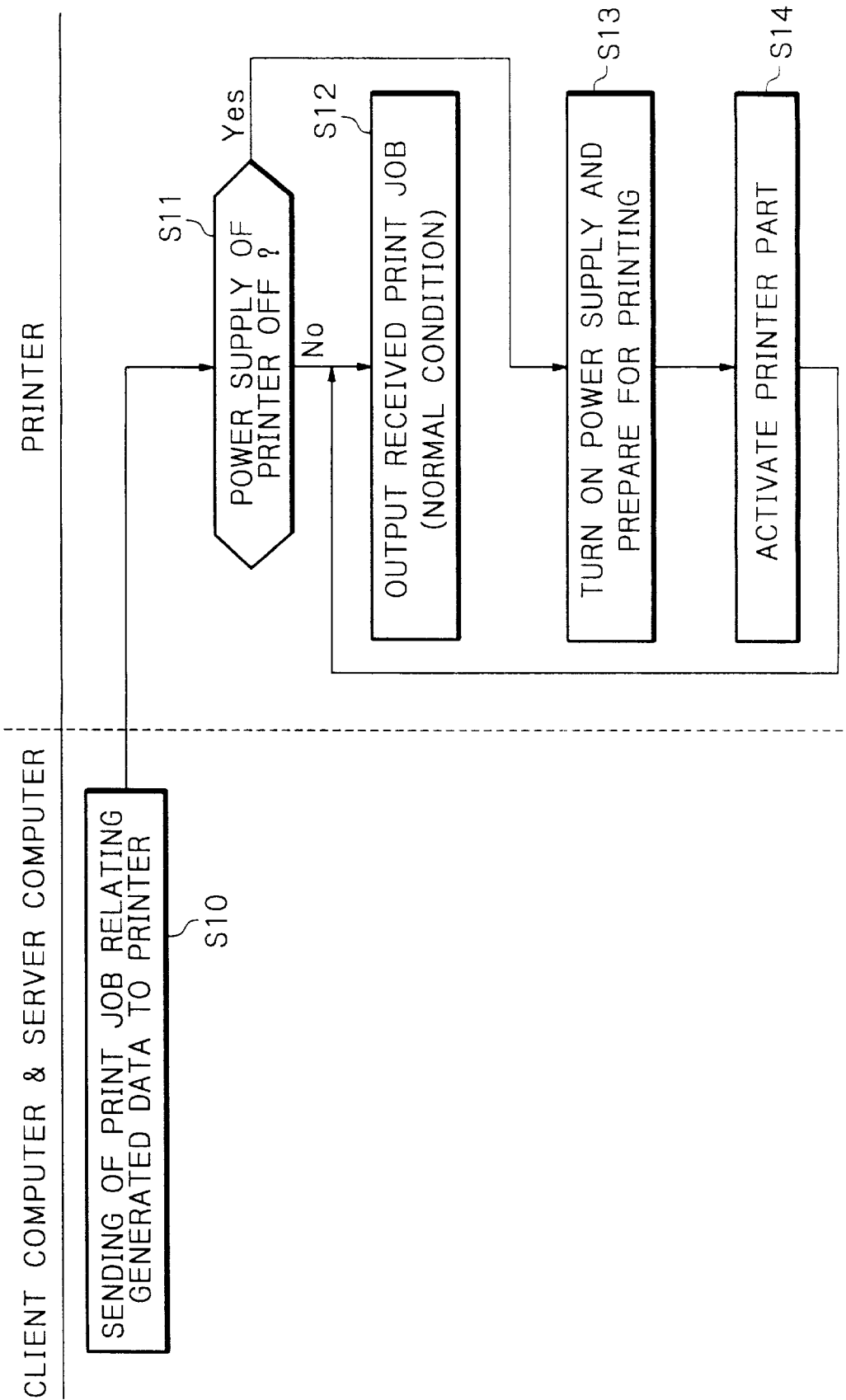
FIG. 4 is a flowchart demonstrating a specific operation for turning on the power supply of the network printer.

FIG. 4 shows a specific procedure for turning on the power supply of the printer when a print job is input. As shown, the operator of the client computer prepares data on the computer and sends a print job relating to the data to the server computer (step S10). In response, the server computer determines whether or not the printer is out of operation, i.e., in a power OFF state (step S11). If the answer of the step S11 is No, meaning that the printer is in operation, the server computer sends various data including video data to the printer and commands it to print them out. In response, the printer executes the print job (step S12). If the answer of the step S11 is Yes, the printer 30 turns on its power supply section and prepares for printing (step S13). Subsequently, the printer 30 activates its printing parts (step S14).

In summary, in accordance with the present invention, when a certain user intends to turn on or turn off a network printer by remote control, the printer itself confirms the connection of the other users so as to determine whether or not the printer is allowed to turn off its power supply. This obviates the abrupt turn-off of the printer shared by all the users, i.e., allows each user to access the printer anytime. In addition, the user can turn off the printer without walking up all the way to the printer. Further, even when the network printer is in its power-off state, the user can automatically turn it on by issuing a print job.

Various modifications will become possible for those skilled in the art after receiving the teachings of the present disclosure without departing from the scope thereof.

What is claimed is:

1. A printer system including a plurality of client computers and a single network printer connectable to said plurality of client computers via a server computer, said printer system comprising:

power supply control means included in said network printer for selectively turning on or turning off a power supply of said network printer in response to remote control effected from any one of the plurality of client computers via the server computer; and conforming means included in said network printer for confirming, in response to a power off command received from any one of the plurality of client computers via the server computer, whether or not client computers other than the one client computer are still operating, wherein said power supply control means turns off the power supply of the network printer to completely shut down the network printer if the confirming means confirms the other client computers are not still operating, wherein said power supply control means turns on said power supply in response to a print job received from any one of the plurality of client computers via the server computer.

2. A printer system including a plurality of client computers and a single network printer connectable to said plurality of client computers via a server computer, said printer system comprising:

a power supply control unit included in said network printer and configured to selectively turn on or turn off a power supply of said network printer in response to remote control effected from any one of the plurality of client computers via the server computer; and a confirming unit included in said network printer and configured to confirm, in response to a power off command received from any one of the plurality of client computers via the server computer, whether or not client computers other than the one client computer are still operating, wherein said power supply control unit turns off the power supply of the network printer to completely shut down the network printer if the confirming unit confirms the other client computers are not sill operating, wherein said power supply control unit turns on said power supply in response to a print job received from any one of the plurality of client computers via the server computer.

* * * * *